(12) United States Patent
Kang et al.

(10) Patent No.: US 11,567,360 B2
(45) Date of Patent: *Jan. 31, 2023

(54) BACKLIGHT UNIT AND LIQUID CRYSTAL DISPLAY INCLUDING THE SAME

(71) Applicant: SAMSUNG ELECTRONICS CO., LTD., Suwon-si (KR)

(72) Inventors: Hyun A Kang, Suwon-si (KR); Eun Joo Jang, Suwon-si (KR); Hyo Sook Jang, Hwaseong-si (KR); Shin Ae Jun, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 166 days.

This patent is subject to a terminal disclaimer.

(21) Appl. No.: 16/989,794

(22) Filed: Aug. 10, 2020

(65) Prior Publication Data

US 2020/0371396 A1    Nov. 26, 2020

Related U.S. Application Data

(63) Continuation of application No. 15/670,399, filed on Aug. 7, 2017, now Pat. No. 10,739,634, which is a
(Continued)

(30) Foreign Application Priority Data

Dec. 9, 2011   (KR) .................. 10-2011-0132328

(51) Int. Cl.
   *G02F 1/1335* (2006.01)
   *C09D 123/08* (2006.01)
   (Continued)

(52) U.S. Cl.
   CPC .......... *G02F 1/133524* (2013.01); *C08K 9/08* (2013.01); *C09D 123/0869* (2013.01);
   (Continued)

(58) Field of Classification Search
   CPC ......... G02F 1/133524; G02F 1/133615; G02F 2202/107; G02F 2202/106; G02F 2202/10;
   (Continued)

(56) References Cited

U.S. PATENT DOCUMENTS

3,976,553 A    8/1976  Larsen
5,585,035 A    12/1996 Nerad et al.
(Continued)

FOREIGN PATENT DOCUMENTS

CN    10191681 A    12/2010
JP    07165859 A    6/1995
(Continued)

OTHER PUBLICATIONS

"Clear Plastic Supplies" Acrylic PMMA Material Specification, downloaded from URL < http://www.clearplasticsupplies.co.uk/material.htm> on Dec. 13, 2012.
(Continued)

*Primary Examiner* — Anthony J Frost
(74) *Attorney, Agent, or Firm* — Cantor Colburn LLP

(57) ABSTRACT

A backlight unit for a liquid crystal display device, the backlight unit including: an light emitting diode ("LED") light source; a light conversion layer disposed separate from the LED light source to convert light emitted from the LED light source to white light and to provide the white light to the liquid crystal panel; and a light guide panel disposed between the LED light source and the light conversion layer, wherein the light conversion layer includes a semiconductor nanocrystal and a polymer matrix, and wherein the polymer matrix includes a first polymerized polymer of a first monomer including at least two thiol (—SH) groups, each located at a terminal end of the first monomer, and a second monomer including at least two unsaturated carbon-carbon
(Continued)

bonds, each located at a terminal end of the second monomer.

19 Claims, 7 Drawing Sheets

Related U.S. Application Data continuation of application No. 13/708,431, filed on Dec. 7, 2012, now Pat. No. 9,726,928.

(51) Int. Cl.
| | |
|---|---|
| *C09K 11/02* | (2006.01) |
| *G02F 1/13357* | (2006.01) |
| *C09K 11/56* | (2006.01) |
| *C09K 11/70* | (2006.01) |
| *C09K 11/88* | (2006.01) |
| *C08K 9/08* | (2006.01) |

(52) U.S. Cl.
CPC ............ *C09K 11/02* (2013.01); *C09K 11/565* (2013.01); *C09K 11/70* (2013.01); *C09K 11/883* (2013.01); *G02F 1/133615* (2013.01); B32B 2457/202 (2013.01); C09K 2323/00 (2020.08); C09K 2323/03 (2020.08); *G02F 1/133614* (2021.01); *G02F 2202/022* (2013.01); *G02F 2202/10* (2013.01); *G02F 2202/106* (2013.01); *G02F 2202/107* (2013.01); Y02B 20/00 (2013.01)

(58) Field of Classification Search
CPC ... G02F 2202/022; G02F 2001/133614; G02F 1/133621; C09D 123/0869; C08K 9/08; C09K 11/883; C09K 11/70; C09K 11/565; C09K 11/02; Y10T 428/1036; Y10T 428/10; B32B 2457/202; Y02B 20/181
See application file for complete search history.

(56) References Cited

U.S. PATENT DOCUMENTS

| | | | |
|---|---|---|---|
| 5,593,615 A | 1/1997 | Nerad et al. | |
| 5,641,426 A | 6/1997 | Nerad et al. | |
| 5,876,805 A | 3/1999 | Ostlie | |
| 5,919,487 A | 7/1999 | Simonnet et al. | |
| 5,977,276 A | 11/1999 | Toh et al. | |
| 6,172,140 B1 | 1/2001 | Toh et al. | |
| 6,251,303 B1 | 6/2001 | Bawendi et al. | |
| 6,306,610 B1 | 10/2001 | Bawendi et al. | |
| 6,313,251 B1 | 11/2001 | Toh et al. | |
| 6,391,983 B1 | 5/2002 | Bateman et al. | |
| 6,426,513 B1 | 7/2002 | Bawendi et al. | |
| 6,605,691 B1 | 8/2003 | Gross et al. | |
| 6,605,692 B1 | 8/2003 | Gross et al. | |
| 6,645,569 B2 | 11/2003 | Cramer et al. | |
| 6,809,165 B2 | 10/2004 | Christie et al. | |
| 6,870,311 B2 | 3/2005 | Mueller et al. | |
| 7,160,613 B2 | 1/2007 | Bawendi et al. | |
| 7,371,804 B2 | 5/2008 | Jethmalani et al. | |
| 7,553,925 B2 | 6/2009 | Bojkova | |
| 7,692,373 B2 | 4/2010 | Bawendi et al. | |
| 7,709,545 B2 | 5/2010 | Hoyle et al. | |
| 7,821,719 B2 | 10/2010 | Jethmalani et al. | |
| 7,888,399 B2 * | 2/2011 | Miyata ................. G03F 7/0275 522/167 | |
| 7,927,515 B2 | 4/2011 | Jang et al. | |
| 8,035,772 B2 | 10/2011 | Kim et al. | |
| 8,105,507 B2 | 1/2012 | Jang et al. | |
| 8,129,074 B2 | 3/2012 | Chen et al. | |
| 8,436,964 B2 | 5/2013 | Kim et al. | |
| 8,618,528 B2 | 12/2013 | Gillies et al. | |
| 9,382,470 B2 | 7/2016 | Kang et al. | |
| 9,701,901 B2 | 7/2017 | Kang et al. | |
| 9,726,928 B2 * | 8/2017 | Kang .................. C09K 11/565 | |
| 2003/0036620 A1 | 2/2003 | Kawanabe et al. | |
| 2005/0031871 A1 | 2/2005 | Kinsho et al. | |
| 2006/0003156 A1 | 1/2006 | Masutani et al. | |
| 2006/0065989 A1 | 3/2006 | Druffel et al. | |
| 2006/0127665 A1 | 6/2006 | Masutani et al. | |
| 2006/0263593 A1 | 11/2006 | Aziz et al. | |
| 2007/0114931 A1 | 5/2007 | Son et al. | |
| 2007/0185261 A1 | 8/2007 | Lee et al. | |
| 2008/0068723 A1 | 3/2008 | Jethmalani et al. | |
| 2008/0152933 A1 | 6/2008 | Mizuno et al. | |
| 2008/0173886 A1 | 7/2008 | Cheon et al. | |
| 2008/0230750 A1 | 9/2008 | Gillies et al. | |
| 2008/0246388 A1 | 10/2008 | Cheon et al. | |
| 2008/0252209 A1 | 10/2008 | Jang et al. | |
| 2008/0268249 A1 | 10/2008 | Araki et al. | |
| 2009/0001395 A1 | 1/2009 | Chung et al. | |
| 2009/0050848 A1 | 2/2009 | Kim et al. | |
| 2009/0073349 A1 * | 3/2009 | Park ..................... G03F 7/0037 430/311 | |
| 2009/0096136 A1 | 4/2009 | Hawker et al. | |
| 2009/0096190 A1 | 4/2009 | Sharp | |
| 2009/0121195 A1 | 5/2009 | Lee et al. | |
| 2009/0180055 A1 * | 7/2009 | Kim .................. G02F 1/133603 362/97.3 | |
| 2009/0230363 A1 | 9/2009 | Lee et al. | |
| 2009/0253805 A1 | 10/2009 | Hoyle et al. | |
| 2009/0264669 A1 | 10/2009 | Upshaw | |
| 2009/0294742 A1 | 12/2009 | Jang et al. | |
| 2010/0109025 A1 | 5/2010 | Bhat et al. | |
| 2010/0123155 A1 | 5/2010 | Pickett et al. | |
| 2010/0137474 A1 | 6/2010 | Goh et al. | |
| 2010/0208493 A1 | 8/2010 | Choi et al. | |
| 2010/0244731 A1 | 9/2010 | Kaihotsu et al. | |
| 2010/0291702 A1 | 11/2010 | Naasani | |
| 2011/0006321 A1 | 1/2011 | Chang et al. | |
| 2011/0068322 A1 | 3/2011 | Pickett et al. | |
| 2011/0081538 A1 | 4/2011 | Linton et al. | |
| 2011/0199555 A1 | 8/2011 | Coe-Sullivan et al. | |
| 2011/0248253 A1 * | 10/2011 | Yamana .............. H01L 51/5271 257/E51.019 | |
| 2011/0305041 A1 | 12/2011 | Louh | |
| 2012/0001217 A1 | 1/2012 | Kang et al. | |
| 2012/0091406 A1 | 4/2012 | Jang et al. | |
| 2012/0193605 A1 | 8/2012 | Gillies et al. | |
| 2012/0293063 A1 | 11/2012 | Kang et al. | |
| 2015/0218444 A1 | 8/2015 | Kang et al. | |

FOREIGN PATENT DOCUMENTS

| | | | |
|---|---|---|---|
| JP | 2002155141 A | * | 5/2002 |
| JP | 2002155141 A | | 5/2002 |
| JP | 2004015063 A | | 1/2004 |
| JP | 2008156390 | | 7/2008 |
| JP | 2008156390 A | | 7/2008 |
| JP | 2008244209 A | | 10/2008 |
| KR | 1020060048512 A | | 5/2006 |
| KR | 1020060120502 A | | 11/2006 |
| KR | 100719580 B1 | | 5/2007 |
| KR | 1020070076832 A | | 7/2007 |
| KR | 1020090028928 | | 3/2009 |
| KR | 1020090049736 A | | 5/2009 |
| KR | 1020090078547 | | 7/2009 |
| KR | 1020090124550 | | 12/2009 |
| KR | 1020100089606 A | | 8/2010 |
| KR | 1020100094194 A | | 8/2010 |
| KR | 1020110033254 A | | 3/2011 |
| WO | 0068297 | | 11/2000 |
| WO | 0068297 A1 | | 11/2000 |
| WO | 2008116079 | | 9/2008 |
| WO | 2008116079 A1 | | 9/2008 |
| WO | 2010002562 A1 | | 1/2010 |

(56) References Cited

OTHER PUBLICATIONS

"Clear Plastic Supplies" downloaded from URL<http://www.clearplasticsupplies.co.uk/material.htm>on Dec. 13, 2012.
"Polyacrylic Acid", downloaded from URL < http://dtcl.guidechem.com/pro-show1999620.html >on Oct. 31, 2013.
"Polyacrylic Acid", downloaded from URL < http://dtcl.guidechem.com/pro-show1999620.html > on Sep. 14, 2013.
The mid-power LED lighting trend: Q:A with Philips Lumileds CEO, downloaded from URL <http://www.digitimes.com/news/a20130909PD201.html > on Sep. 13, 2013.
3-aminopropylmethyl bis-(trimethyl siloxy) silane downloaded from URL<http://www.signaaldrich.com/catalog/product/aldrich/371890?lang=en®ion+US > Dec. 8, 2014.
Bhargava, R.N. et al., "Optical Properties of Manganese-Doped Nanocrystals of ZnS," Physical Review Letters, vol. 72, No. 3, Jan. 17, 1994, pp. 416-419.
C. Hoyle et al., "Thiol-click chemistry: a multifaceted toolbox for small molecule and polymer synthesis," Chemical Society Reviews, 2010, pp. 1355-1387, vol. 39, No. 4.
C.E. Hoyle et al., "Thiol-Enes: Chemistry of the Past with Promise for the Future," Highlight, Journal of Polymer Science: Part A: Polymer Chemistry, 2004, pp. 5301-5338, vol. 42.
Chang et al., "Light Emitting diodes Reliability Review", Microelectronics Reliability, vol. 525, 2012, pp. 762-782.
Chen et al., "Surface Modification of CdSe and CdS Quantum dots-Experimental and Density Function Theory Investigation" Intech 2012, p. 149-168.
Chin, Lim Wei et al., "Thermo-mechanical and Light Transmittance of Silica Diffusant Filled Epoxy Composites," Journal of Physical Science, vol. 21, No. 1, 2010, pp. 93-107.
Chinese Patent Office Action dated Dec. 23, 2013 of the corresponding application Chinese Patent Application No. 201180042256.3, with English translation, 13 pages.
Chiou, Bor-Sen et al., "Effect of Colloidal Fillers on the Cross-Linking of a UV-Curable Polymer: Gel Point Rheology and the Winter-Chambon Criterion," Macromolecules, vol. 34, No. 13, 2001, pp. 4526-4533.
Clear Plastic Supplies, downloaded from URL <http://www.clearplasticsupplied.co.uk/material.htm> on Dec. 13, 2012.
Clinton, Jamie C., "Colloidal Cerium Oxide Nanoparticles: Synthesis and Characterization Techniques," Diss. Virginia Polytechnic Institute and State University, Jan. 26, 2008, Blacksburg: Department of Electrical Science and Engineering, 2008, 89 page.
Definition of Antioxidant downloaded from URL <http://www.merriam-webster.com/dictionary/antioxidant> Oct. 1, 2015.
Dollefeld et al., "Investigations on the Stability of Thiol Stabilized Semiconductor Nanoparticles" Physical Chemistry Chemical Physics, vol. 4, 2002, pp. 4747-4753.
Efros, A. "Auger Processes in Nanosize Semidonductor Crystals", Naval Research Laboratory, Apr. 11, 2002, pp. 1-31, Figs. 1-15.
Extended European Search Report of EP 11801185.7, dated Jul. 8, 2015.
Final Office Action dated May 1, 2013 from related U.S. Appl. No. 13/175,133, 33 pages.
Final Office Action dated Jan. 16, 2014 from related U.S. Appl. No. 13/175,133, 218 pages.
Fu, Shao-Yun "Multifunctional Transparent Epoxy Nanocomposites as Encapsulating Materials for LED Devices," Multifunctional Nanocomposites Proc. of ICCM17, Edinburgh. Edinburgh: ICCM.org., 2009, pp. 1-9.
Gaponik, N., "Assemblies of thiol-capped nanocrystals as functional units for use in nanotechnology" University of Dresden, diss. Dec. 2011.
Gaponik, Nikolai "Asssemblies of thiol-capped Nanocrystals as Building Blocks for Use in nanotechtechnology", Journal of Materials chemistry, vol. 20., No. 25, 2010, pp. 5174-5181.
Ghosh, R., et al., "Core/Shell Nanoparticles: Classes, Properties, Synthesis Mechanisms Characterization, and Applications," Chem. Rev. 2012, 112, pp. 2373-2433.
H. Zhang et al., "Electrospinning Preparation and Luminescence Properties of Europium Complex/Polymer Composite Fibers," J. Phys. Chem. C, 2008, pp. 9155-9162, vol. 112, No. 25.
Hoyle C. E., Lee, T. Y., and Roper, T. (2004), Thiol-enes: Chemistry of the past with promise for the future. J. Polym. Sci. A: Polym. Chem., 42:5301-5338.
Hoyle et al., "Thiol-Ene Click Chemistry**'", Angew. Chem. Int. Ed., 49, 2010, pp. 1540-1573.
Hoyle et al., "Thiol-Ene Click Chemistry**",Angew. Chem. Int. Ed, 49, 2010, 1540-1573.
Hoyle et al., "Thiol-Enes: Chemistry of the Past with Promise for the Future", J. Polym. Sci. Part A: Polym. chem., vol. 42, 2004, pp. 5301-5338.
Hoyle et al., Thiol-Enes: Chemistry of the Past with Promise for the Future, Journal of Polymer Science: Part A: Polymer Chemistry, vol. 42, 2004, 5301-533.
Hoyle et al., Thiol-Enes: Chemistry of the Past with Promise for the Future, Journal of Polymer Science: part A: Polymer Chemistry, vol. 42, 2004, pp. 5301-5338.
Hoyle, C. et al., "Thiol-click chemistry: a multifaceted toolbox for small molecule and polymer synthesis," Chemical Society Reviews, vol. 39, No. 4, 2010, pp. 1355-1387.
Hoyle, C.E. et al., "Thiol-Enes: Chemistry of the Past with Promise for the Future," Highlight, Journal of Polymer Science: Part A: Polymer Chemistry, vol. 42, 2004, pp. 5301-5338.
International Search Report for International Application No. PCT/KR2011/004871, dated Feb. 6, 2012, 5 pages.
J. Liu et al., Nanoparticle Dispersion and Aggregation in Polymer Nanocomposites: Insights from Molecular Dynamics Simulation, 2011 American Chemical Society, Langmuir 2011, 27, pp. 7926-7933.
J. Ziegler et al., Silica-Coated InP/ZnS Nanocrystals as Converter Material in White LEDs, Advanced Materials 20.21 (2008): pp. 4068-4073.
Japan Office Action dated Apr. 6, 2015.
Jeong et al., "Effect of the Thiol-Thiolate Equilibrium on the Photophysical Properties of Aqueous CdSe/ZnS nanocrystal Quantum dots" Journal of the American Chemical Society, vol. 127., No. 29, 2005, p. 10126-10127.
Kade, M. et al., "The Power of Thiol-ene Chemistry," Journal of Polymer Science Part A: Polymer Chemistry, vol. 48, No. 4, 2010, pp. 743-750.
Kim et al. "Reverse Type-I ZnSe/Inp/ZnS Core/Shell/Shell Nanocrystals: Cadmium-Free Quantum Dots for Visible Luminescence"; Samsung Adv. Inst. of Tech.; 5 pages.
Kim, Sungwoo, et al.. "Reverse Type-I ZnSe/InP/ZnS Core/Shell/Shell Nanocrystals: Cadmium-Free Quantum Dots for Visible Luminescence," Samsung Advanced Institute of Technology, 5 pages.
Konishi et al, "Enhancement of photoluminescence of ZnS. Mn Nanocrystals by hybridizing with polymerized acrylic acid", Journal of Luminescence 93, 2001, 1-8.

* cited by examiner

BACKLIGHT UNIT AND LIQUID CRYSTAL DISPLAY INCLUDING THE SAME

This application is a continuation of U.S. patent application Ser. No. 15/670,399 filed Aug. 7, 2017, which issued as U.S. Pat. No. 10,739,634, which in turn is a continuation of U.S. patent application Ser. No. 13/708,431 filed on Dec. 7, 2012, which issued as U.S. Pat. No. 6,726,928, and which claims priority to Korean Patent Application No. 10-2011-0132328, filed on Dec. 9, 2011, and all the benefits accruing therefrom under 35 U.S.C. §§ 119, 120, the contents of which in their entireties are incorporated herein by reference.

BACKGROUND

1. Field

This disclosure relates to a backlight unit and a liquid crystal display device including the same.

2. Description of the Related Art

Liquid crystal display ("LCD") devices are a type of display device which form an image by receiving external light instead of using self-emitted light to form the image, as is the case in plasma display panels ("PDPs") and field emission displays ("FEDs"), for example. Thus, the LCD device uses a backlight unit for emitting light at a rear surface of the LCD device.

A backlight unit for an LCD device can use a cold cathode fluorescent lamp ("CCFL") as a light source. However, when the CCFL is used as a light source, it is difficult to provide desirable uniformity of luminance of light supplied from the CCFL and color purity deteriorates as a screen size of the LCD device increases.

A backlight unit which uses three color LEDs as a light source has been recently developed. Since the backlight unit using the three color LEDs as the light source produces improved color purity, as compared to the backlight unit using the CCFL, it can be used to provide a higher quality display device, for example. However, the backlight unit which uses the three color LEDs as the light source is more costly as compared to the backlight unit which uses the CCFL as the light source. To mitigate this problem, a white LED which emits light by converting light output from a single color LED chip to white light has been proposed.

However, although the white LED is not as expensive as the three color LEDs, color purity and color reproducibility are reduced as compared to the color purity and color reproducibility of an LCD device including the three color LEDs. Accordingly, various attempts for developing semiconductor nanocrystals as light converting materials to improve color purity and color reproducibility while maintaining price competitiveness have been made. Thus there remains a need for an improved backlight unit.

SUMMARY

An embodiment provides a backlight unit ("BLU") for a liquid crystal display device using a light emitting diode ("LED") as a light source.

Another embodiment provides a liquid crystal display device including the backlight unit.

According to an embodiment, provided is a backlight unit for a liquid crystal display, the backlight unit including: an LED light source;

a light conversion layer disposed separate from the LED light source to convert light emitted from the LED light source to white light and to provide the white light to a liquid crystal panel; and a light guide panel disposed between the LED light source and the light conversion layer, wherein the light conversion layer includes a semiconductor nanocrystal and a polymer matrix, and wherein the polymer matrix includes a first polymerized product of a first monomer including at least two thiol (—SH) groups, each located at a terminal end of the first monomer, and a second monomer including at least two unsaturated carbon-carbon bonds, each located at a terminal end of the second monomer.

The backlight unit may further include a diffusion plate on a light guide panel, and the light conversion layer may be disposed between the light guide panel and diffusion plate, or on a side of the diffusion plate opposite the light guide panel.

The LED light source may be disposed on at least one side of the light conversion layer.

The semiconductor nanocrystal may be a Group II-VI compound, a Group III-V compound, a Group IV-VI compound, a Group IV element, a Group IV compound, or a combination thereof.

The semiconductor nanocrystal may have a full width at half maximum (FWHM) of less than or equal to about 45 nanometers (nm) in a light emitting wavelength spectrum.

The first monomer including at least two thiol (—SH) groups at a terminal end providing the polymer matrix may be represented by the following Chemical Formula 1.

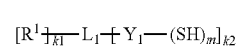

Chemical Formula 1

In Chemical Formula 1, $R^1$ is hydrogen; a substituted or unsubstituted C1 to C30 alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a substituted or unsubstituted C2 to C30 alkenyl group; a substituted or unsubstituted C2 to C30 alkynyl group; a substituted or unsubstituted C3 to C30 alicyclic organic group including ring having a double bond or triple bond in the ring; a substituted or unsubstituted C3 to C30 heterocycloalkyl group including a ring having a double bond or triple bond in the ring; a C3 to C30 alicyclic organic group substituted with a C2 to C30 alkenyl group or a C2 to C30 alkynyl group; a C3 to C30 heterocycloalkyl group substituted with a C2 to C30 alkenyl group or a C2 to C30 alkynyl group; a hydroxy group; —NH$_2$; a substituted or unsubstituted C1 to C30 amine group of the formula —NRR', wherein R and R' are independently hydrogen or a C1 to C30 alkyl group; an isocyanurate group; a (meth)acrylate group; a halogen; —ROR' wherein R is a substituted or unsubstituted C1 to C20 alkylene group and R' is hydrogen or a C1 to C20 alkyl group; —C(=O)OR' wherein R' is hydrogen or a C1 to C20 alkyl group; —ON; or —C(=O)ONRR' wherein R and R' are each independently hydrogen or a C1 to C20 alkyl group, $L_1$ is a single bond; a substituted or unsubstituted C1 to C30 alkylene group; a substituted or unsubstituted C6 to C30 arylene group; a substituted or to unsubstituted C3 to C30 heteroarylene group; a substituted or unsubstituted C3 to C30 cycloalkylene group; or a substituted or unsubstituted C3 to C30 heterocycloalkylene group, Y$_1$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene group (—CH$_2$—) is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group of the formula —C(=O)NR— wherein R is hydrogen or a C1 to C10 alkyl group, —NR— wherein R is hydrogen or a C1 to C10 alkyl group, or a combination thereof, m is an integer of 1 or more,
k1 is an integer of 0 or 1 or more,
k2 is an integer of 1 or more,
the sum of m and k2 is an integer of 3 or more,
m does not exceed the valance of Y$_1$, and
the sum of k1 and k2 does not exceed the valence of the L$_1$.

The second monomer providing the polymer matrix may be represented by the following Chemical Formula 2.

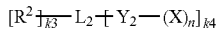

Chemical Formula 2

In Chemical Formula 2,

X is a C2 to C30 aliphatic organic group including a carbon-carbon double bond or a carbon-carbon triple bond, a C6 to C30 aromatic organic group including a carbon-carbon double bond or a carbon-carbon triple bond, or a C3 to C30 alicyclic organic group including a carbon-carbon double bond or a carbon-carbon triple bond, R$^2$ is hydrogen; a substituted or unsubstituted C1 to C30 alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a substituted or unsubstituted C2 to C30 alkenyl group; a substituted or unsubstituted C2 to C30 alkynyl group; a substituted or unsubstituted C3 to C30 alicyclic organic group including a ring having a double bond or triple bond in the ring; a substituted or unsubstituted C3 to C30 heterocycloalkyl group including a ring having a double bond or triple bond in the ring; a C3 to C30 alicyclic organic group substituted with a C2 to C30 alkenyl group or a C2 to C30 alkynyl group; a C3 to C30 heterocycloalkyl group substituted with a C2 to C30 alkenyl group or a C2 to C30 alkynyl group; a hydroxy group; —NH$_2$; a substituted or unsubstituted C1 to C30 amine group of the formula —NRR', wherein R and R' are independently hydrogen or a C1 to C20 alkyl group; an isocyanate group; an isocyanurate group; a (meth)acrylate group; a halogen; —ROR' wherein R is a substituted or unsubstituted C1 to C20 alkylene group and R' is hydrogen or a C1 to C20 alkyl group; an acyl halide group of the formula —RC(=O)X, wherein R is a substituted or unsubstituted alkylene group, and X is a halogen; —C(=O)OR' wherein R' is hydrogen or a C1 to C20 alkyl group; —ON; or —C(=O)ONRR' wherein R and R' are independently hydrogen or a C1 to C20 alkyl group, L$_2$ is a single bond, a substituted or unsubstituted C1 to C30 alkylene group, a substituted or unsubstituted C6 to C30 arylene group, or a substituted or unsubstituted C3 to C30 heteroarylene group, Y$_2$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene group (—CH$_2$—) is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group of the formula —C(=O)NR— wherein R is hydrogen or a C1 to C10 alkyl group, —NR— wherein R is hydrogen or a C1 to C10 alkyl group, or a combination thereof, n is an integer of 1 or more, k3 is an integer of 0 or 1 or more,
k4 is an integer of 1 or more,
the sum of n and k4 is an integer of 3 or more,
n does not exceed the valance of Y$_2$, and
the sum of k3 and k4 does not exceed the valence of the L$_2$.

The polymer matrix of the light conversion layer may include a product of further polymerizing a third monomer having a thiol group located at the terminal end of the third monomer, a fourth monomer having an unsaturated carbon-carbon bond at a terminal end of the fourth monomer, or a combination thereof in addition to the first monomer and the second monomer.

The light conversion layer may further include an inorganic oxide.

The semiconductor nanocrystal may further include a coating, the coating including a polymer having a carboxyl group, or a salt thereof.

The polymer having a carboxyl group or a salt thereof may be a poly(alkylene-co-acrylic acid), poly(alkylene-co-methacrylic acid), a salt thereof, or a combination thereof.

The white light emitted from the light conversion layer may have Cx of about 0.24 to about 0.56 and Cy of about 0.24 to about 0.42 in a CIE 1931 chromaticity diagram.

When the LED light source is a blue LED light source, the green light emitting semiconductor nanocrystal and the red light emitting semiconductor nanocrystal may be used in an optical density ratio of about 2:1 to about 7:1 to provide white light, wherein the optical density is determined using an absorbance of a first absorption maximum in a UV-Vis absorption spectrum.

The light conversion layer may include a plurality of layers which are disposed to provide a light emitting wavelength of lower energy in a direction towards the LED light source.

The light conversion layer may be in the form of a film including the semiconductor nanocrystal and the polymer matrix; optionally further including at least one of a first polymer film and a second polymer film disposed on at least one surface of the film, wherein the first polymer film and the second polymer film may each independently include a polyester, a cyclic olefin polymer ("COP"), a second polymerized product of the first monomer including at least two thiol (—SH) groups, each located at the terminal end of the first monomer, and the second monomer including at least two unsaturated carbon-carbon bonds at a terminal end of the second monomer, or a combination thereof.

At least one of the first polymer film and the second polymer film may further include an inorganic oxide.

At least one of the first polymer film and the second polymer film may have concavo-convex pattern on a side opposite the light conversion layer.

According to another embodiment, provided is a liquid crystal display device that includes:

an LED light source;

a light conversion layer disposed separate from the LED light source to convert light emitted from the LED light source to white light and to provide the white light to the liquid crystal panel;

a light guide panel disposed between the LED light source and the light conversion layer; and a liquid crystal panel for providing an image using light provided from the light conversion layer, wherein the light conversion layer includes a semiconductor nanocrystal and a polymer matrix, and wherein the polymer matrix includes a first polymerized product of a first monomer including at least two thiol (—SH) groups, each located at a terminal end of the first monomer, and a second monomer including at least two unsaturated carbon-carbon bonds, each located at a terminal end of the second monomer.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
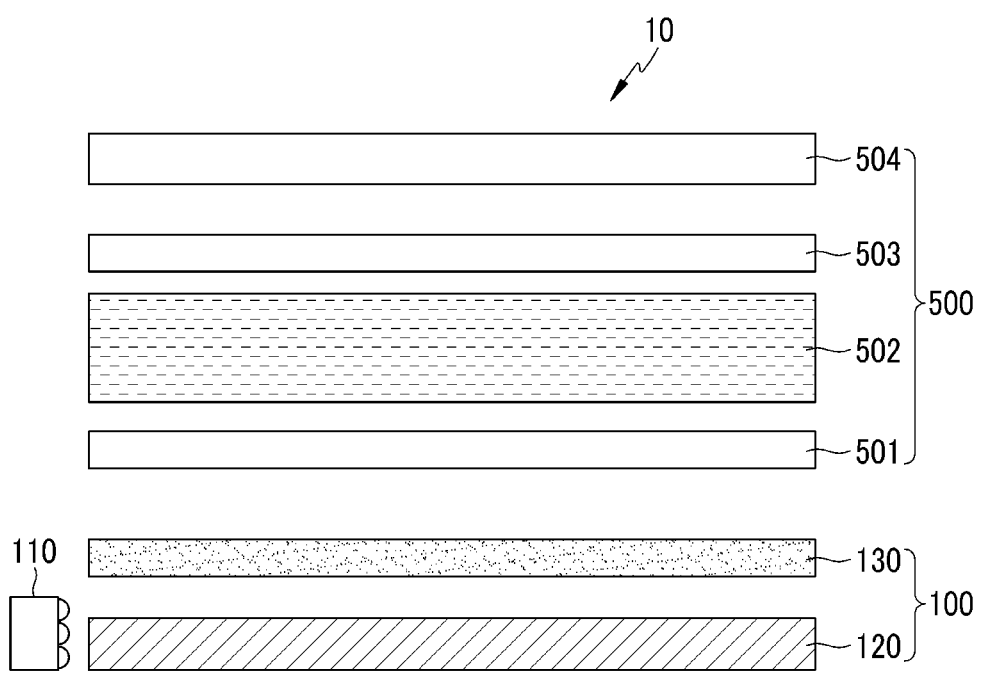
FIG. 1 is a schematic view of an embodiment of a liquid crystal display device.

This disclosure will be described more fully hereinafter in the following detailed description of this disclosure, in which some but not all embodiments of this disclosure are described. This disclosure may be embodied in many different forms and is not be construed as limited to the embodiments set forth herein; rather, these embodiments are provided so that this disclosure will fully convey the scope of the invention to those skilled in the art.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, when a definition is not otherwise provided, the term "substituted" may refer to one substituted with a substituent which may be a C1 to C30 alkyl group, a C2 to C30 alkynyl group, a C6 to C30 aryl group, a C7 to C30 alkylaryl group, a C1 to C30 alkoxy, a C6 to C30 an aryloxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (—F, —Cl, —Br, or —I), a hydroxy group (—OH), a nitro group (—NO$_2$), a cyano group (—CN), an amino group (NRR', wherein R and R' are independently hydrogen or a C1 to C6 alkyl group), an azido group (—N$_3$), an amidino group (—C(=NH)NH$_2$), a hydrazino group (—NHNH$_2$), a hydrazono group (=N(NH$_2$), an aldehyde group (—C(=O)H), a carbamoyl group (—C(O)NH$_2$), a thiol group (—SH), an ester group (—C(=O)OR, wherein R is a C1 to C6 alkyl group or a C6 to C12 aryl group), a carboxyl group or a salt thereof, a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), or a combination thereof instead of hydrogen, provided that the substituted atom's normal valence is not exceeded.

As used herein, when a definition is not otherwise provided, the prefix "hetero" may refer to a group that includes at least one ring member (e.g., 1 to 4 ring members) that is a heteroatom (e.g., 1 to 4 heteroatoms, each independently N, O, S, Si, or P). The total number of ring members may be 3 to 10. If multiple rings are present, each ring is independently aromatic, saturated, or partially unsaturated, and multiple rings, if present, may be fused, pendant, spirocyclic, or a combination thereof. Heterocycloalkyl groups include at least one non-aromatic ring that contains a heteroatom ring member. Heteroaryl groups include at least one aromatic ring that contains a heteroatom ring member. Non-aromatic and/or carbocyclic rings may also be present in a heteroaryl group, provided that at least one ring is both aromatic and contains a ring member that is a heteroatom.

As used herein, the term "alkylene group" may refer to a straight or branched saturated aliphatic hydrocarbon group having a valence of at least two, optionally substituted with one or more substituents where indicated, provided that the valence of the alkylene group is not exceeded. The term "arylene group" may refer to a functional group having a valence of at least two obtained by removal of two hydrogens in an aromatic ring, optionally substituted with one or more substituents where indicated, provided that the valence of the alkylene group is not exceeded. As used herein, the term "aliphatic organic group" may refer to a C1 to C30 linear or branched alkyl group, the term "aromatic organic group" may refer to a C6 to C30 aryl group or a C2 to C30 heteroaryl group, and the term "alicyclic organic group" may refer to a C3 to C30 cycloalkyl group, a C3 to C30 cycloalkenyl group, and a C3 to C30 cycloalkynyl group.

As used herein, the term "combination thereof" refers to a mixture, a stacked structure, a composite, an alloy, a blend, a reaction product, or the like.

As used herein, (meth)acrylate refers to acrylate and methacrylate.

Hereinafter, referring to drawings, the backlight unit according to an embodiment and a liquid crystal display device including the same are further disclosed.

FIG. 1 is a schematic view of an embodiment of the liquid crystal display device 10 including an embodiment of the backlight unit.

Referring to FIG. 1, the liquid crystal display device 10 includes a backlight unit 100 and a liquid crystal panel 500 to provide a predetermined colored image using white light provided from the backlight unit 100.

The backlight unit 100 includes a light emitting diode ("LED") light source 110, a light conversion layer 130 to convert light emitted from the LED light source 110 to white light, and a light guide panel 120 disposed therebetween to guide the light emitted from the LED light source 110 to the light conversion layer 130. According to an embodiment, the LED light source 110 is disposed on a side of the light conversion layer 130. The LED light source 110 includes a plurality of LED chips emitting light having predetermined wavelengths. The LED light source 110 may be a blue light-emitting LED light source or an ultraviolet (UV)-emitting LED light source, for example.

A reflector (not shown) may be further disposed on the lower surface of the light guide panel 120.

The light conversion layer 130 is disposed separate from the LED light source 110 and converts light emitted from the LED light source 110 to white light and thus provides the white light to the liquid crystal panel 500.

Herein, the light conversion layer 130 includes a semiconductor nanocrystal, which is capable of providing excellent color reproducibility and color purity, and a polymer matrix. The semiconductor nanocrystal may include a Group II-VI compound, a Group III-V compound, a Group IV-VI compound, a Group IV element, a Group IV compound, or a combination thereof, wherein the term "Group" refers to a group of the Periodic Table of the Elements.

The Group II-VI compound may include a binary compound, e.g., CdSe, CdTe, ZnS, ZnSe, ZnTe, ZnO, HgS, HgSe, HgTe, MgSe, MgS, or a combination thereof; a ternary compound, e.g., CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, or a combination thereof; or a quaternary compound, e.g., HgZnTeS, CdZnSeS, CdZnSeTe, CdZnSTe, CdHgSeS, CdHgSeTe, CdHgSTe, HgZnSeS, HgZnSeTe, HgZnSTe, or a combination thereof. The Group III-V compound may include a binary compound, e.g., GaN, GaP, GaAs, GaSb, AlN, AlP, AlAs, AlSb, InN, InP, InAs, InSb, or a combination thereof; a ternary compound, e.g., GaNP, GaNAs, GaNSb, GaPAs, GaPSb, AlNP, AlNAs, AlNSb, AlPAs, AlPSb, InNP, InNAs, InNSb, InPAs, InPSb, GaAlNP, or a combination thereof; or a quaternary compound, e.g., GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, or a combination thereof. The Group IV-VI compound may include a binary compound, e.g., SnS, SnSe, SnTe, PbS, PbSe, PbTe, or a combination thereof; a ternary compound, e.g., SnSeS, SnSeTe, SnSTe, PbSeS, PbSeTe, PbSTe, SnPbS, SnPbSe, SnPbTe, or a combination thereof; or a quaternary compound, e.g., SnPbSSe, SnPbSeTe, SnPbSTe, or a combination thereof. The Group IV element may be Si, Ge, or a combination thereof. The Group IV compound may include a binary compound, e.g., SiC, SiGe, or a combination thereof.

Herein, the element, the binary compound, the ternary compound, the quaternary compound, or the combination thereof, may be present in a particle having a substantially uniform concentration, or may be present in a particle having non-uniform concentration, wherein a concentration of the element, the binary compound, the ternary compound, the quaternary compound, or the combination thereof may be independently selected to provide different concentration distributions in the same particle. In addition, each particle may have a core/shell structure in which a first semiconductor nanocrystal is partially or entirely surrounded by a second semiconductor nanocrystal. The core and shell may have an interface, and an element of at least one of the core or the shell may have a concentration gradient that decreases in a direction from the surface of the particle to a center of the particle.

The semiconductor nanocrystal may have a full width at half maximum (FWHM) of less than or equal to about 45 nanometers (nm), specifically less than or equal to about 40 nm, and more specifically less than or equal to about 30 nm, in the light emitting wavelength spectrum. Within this range, color purity or color reproducibility of the light conversion layer 130 may be improved.

The semiconductor nanocrystal may have a particle diameter (e.g., an average largest particle diameter) ranging from about 1 nanometer ("nm") to about 100 nm, specifically about 1 nm to about 50 nm, and more specifically about 1 nm to about 10 nm, or about 2 nm to about 25 nm.

In addition, the nanocrystal may have any suitable shape and the shape is not specifically limited. Examples thereof may include spherical, pyramidal, multi-armed, or cubic nanoparticles, nanotubes, nanowires, nanofiber, nanoplate particles, or the like.

The semiconductor nanocrystal is dispersed in a polymer matrix. The polymer matrix is a polymer obtained by polymerizing a first monomer including at least two thiol (—SH) groups, each located at a terminal end of the first monomer, and a second monomer including at least two unsaturated carbon-carbon bonds, each located at a terminal end of the second monomer.

The first monomer including at least two thiol (—SH) groups, each located at a terminal end of the first monomer, and which is used to provide the polymer matrix, may be represented by the following Chemical Formula 1.

Chemical Formula 1

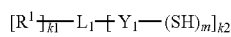

In Chemical Formula 1, $R^1$ is hydrogen; a substituted or unsubstituted C1 to C30 alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a substituted or unsubstituted C2 to C30 alkenyl group; a substituted or unsubstituted C2 to C30 alkynyl group; a substituted or unsubstituted C3 to C30 alicyclic organic group including ring having a double bond or triple bond in the ring; a substituted or unsubstituted C3 to C30 heterocycloalkyl group including to ring having a double bond or triple bond in the ring; a C3 to C30 alicyclic organic group substituted with a C2 to C30 alkenyl group or a C2 to C30 alkynyl group; a C3 to C30 heterocycloalkyl group substituted with a C2 to C30 alkenyl group or a C2 to C30 alkynyl group; a hydroxy group; —NH$_2$; a substituted or unsubstituted C1 to C30 amine group of the formula —NRR', wherein R and R' are independently hydrogen or a C1 to C20 alkyl group; an isocyanurate group; a (meth) acrylate group; a halogen; —ROR' wherein R is a substituted or unsubstituted C1 to C20 alkylene group and R' is hydrogen or a C1 to C20 alkyl group; —C(=O)OR' wherein R' is hydrogen or a C1 to C20 alkyl group; —CN; or —C(=O)ONRR' wherein R and R' are independently hydrogen or a C1 to C20 alkyl group, $L_1$ is a single bond; a substituted or unsubstituted C1 to C30 alkylene group; a substituted or unsubstituted C6 to C30 arylene group; a substituted or unsubstituted C3 to C30 heteroarylene group; a substituted or unsubstituted C3 to C30 cycloalkylene group; or a substituted or unsubstituted C3 to C30 heterocycloalkylene group, $Y_1$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene group (—CH$_2$—) is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group of the formula —C(=O)NR— wherein R is hydrogen or a C1 to C10 alkyl group, —NR— wherein R is hydrogen or a C1 to 010 alkyl group, or a combination thereof, m is an integer of 1 or more, k1 is an integer of 0 or 1 or more, k2 is an integer of 1 or more, the sum of m and k2 is an integer of 3 or more.

In the above Chemical Formula 1, m does not exceed the valance of $Y_1$, and the sum of k1 and k2 does not exceed the valence of the $L_1$. In an embodiment, the sum of m and k2 ranges from 3 to 6, specifically 3 to 5, and in another embodiment, m may be 1, k1 may be 0, and k2 may be 3 or 4.

The thiol group is bonded at the terminal end of $Y_1$, for example when $Y_1$ is an alkylene group, the thiol group is bonded with the last positioned carbon.

The second monomer providing the polymer matrix may be represented by the following Chemical Formula 2.

Chemical Formula 2

In Chemical Formula 2,

X is a C2 to C30 aliphatic organic group including a carbon-carbon double bond or a carbon-carbon triple bond, a C6 to C30 aromatic organic group including a carbon-carbon double bond or a carbon-carbon triple bond, or a C3 to C30 alicyclic organic group including a carbon-carbon double bond or a carbon-carbon triple bond, $R^2$ is hydrogen; a substituted or unsubstituted C1 to C30 alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a substituted or unsubstituted C2 to C30 alkenyl group; a substituted or unsubstituted C2 to C30 alkynyl group; a substituted or unsubstituted C3 to C30 alicyclic organic group including a ring having a double bond or triple bond in the ring; a substituted or unsubstituted C3 to C30 heterocycloalkyl group including a ring having double bond or triple bond in the ring; a C3 to C30 alicyclic organic group substituted with a C2 to C30 alkenyl group or a C2 to C30 alkynyl group; a C3 to C30 heterocycloalkyl group substituted with a C2 to C30 alkenyl group or a C2 to C30 alkynyl group; a hydroxy group; —NH$_2$; a substituted or unsubstituted C1 to C30 amine group of the formula —NRR', wherein R and R' are independently hydrogen or a C1 to C30 alkyl group; an isocyanate group; an isocyanurate group; a (meth)acrylate group; a halogen; —ROR' (wherein R is a substituted or unsubstituted C1 to C20 alkylene group and R' is hydrogen or a C1 to C20 alkyl group); an acyl halide group of the formula —RC(=O)X wherein R is a substituted or unsubstituted alkylene group, and X is a halogen; —C(=O)OR' wherein R' is hydrogen or a C1 to C20 alkyl group; —ON; or —C(=O)ONRR' wherein R and R' are independently hydrogen or a C1 to C20 alkyl group, $L_2$ is a single bond, a substituted or unsubstituted C1 to C30 alkylene group, a substituted or unsubstituted C6 to C30 arylene group, or a substituted or unsubstituted C3 to C30 heteroarylene group, $Y_2$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene group (—CH$_2$—) is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group of the formula —C(=O)NR— wherein R is hydrogen or a C1 to C10 alkyl group, —NR— wherein R is hydrogen or a C1 to C10 alkyl group, or a combination thereof, n is an integer of 1 or more, k3 is an integer of 0 or 1 or more, k4 is an integer of 1 or more, and the sum of n and k4 is an integer of 3 or more.

In Chemical Formula 2, n does not exceed the valance of $Y_2$, and the sum of k3 and k4 does not exceed the valence of the $L_2$. In an embodiment, the sum of n and k4 may range from 3 to 6, specifically 3 to 5, and in another embodiment, n is 1, k3 is 0, and k4 is 3 or 4.

In Chemical Formula 2, X is bonded at the terminal end of $Y_2$, for example when $Y_2$ is an alkylene group, the thiol group is bonded with the last positioned carbon.

The first monomer of the above Chemical Formula 1 may include a monomer of the following Chemical Formula 1-1.

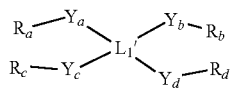

Chemical Formula 1-1

In Chemical Formula 1-1, $L_1'$ is carbon, a substituted or unsubstituted C6 to C30 arylene group, for example a substituted or unsubstituted phenylene group; a substituted or to unsubstituted C3 to C30 heteroarylene group; a substituted or unsubstituted C3 to C30 cycloalkylene group; or a substituted or unsubstituted C3 to C30 heterocycloalkylene group, $Y_a$ to $Y_d$ are each independently a substituted or unsubstituted C1 to C30 alkylene group; a substituted or unsubstituted C2 to C30 alkenylene group; or a C1 to C30 alkylene group or a C2 to C30 alkenylene group wherein at least one methylene group (—CH$_2$—) is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group of the formula —C(=O)NR— wherein R is hydrogen or a C1 to C10 alkyl group, —NR— wherein R is hydrogen or a C1 to C10 alkyl group, or a combination thereof, $R_a$ to $R_d$ are each independently a thiol group (—SH), or one or more of the groups $R_a$—$Y_a$—, $R_b$—$Y_b$—, $R_c$—$Y_c$—, and $R_d$—$Y_d$— are $R_1$ of Chemical Formula 1, provided that at least two of $Y_a$ to $Y_d$ are as defined above and at least two of $R_a$ to $R_d$ are thiol groups (—SH).

In an embodiment, $L_1'$ is a substituted or unsubstituted phenylene group, and thus the substituted or unsubstituted C6 to C30 arylene group may be a substituted or unsubstituted phenylene group.

More specific examples of the first monomer of the above Chemical Formula 1 may include the compounds represented by the following Chemical Formulas 1-2 to 1-5.

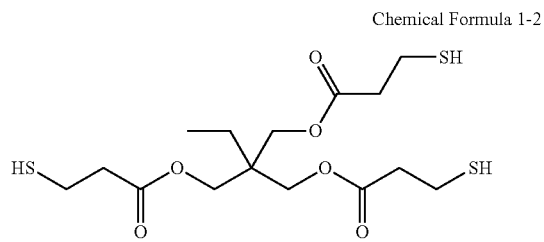

Chemical Formula 1-2

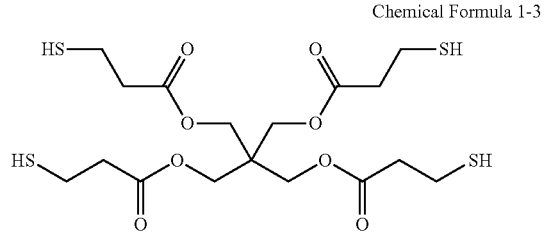

Chemical Formula 1-3

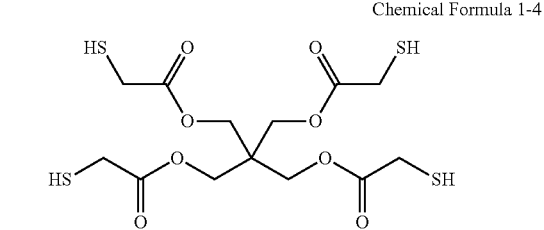

Chemical Formula 1-4

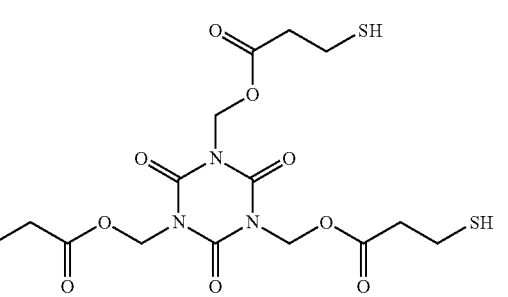

Chemical Formula 1-5

In Chemical Formula 2, the X group may be a carbon-carbon double bond-containing a C1 to C30 aliphatic organic group, a carbon-carbon double bond-containing a C6 to C30 aromatic organic group, or a carbon-carbon double bond-containing a C3 to C30 alicyclic organic group. The X group may be an acrylate group; a methacrylate group; a substituted or unsubstituted C2 to C30 alkenyl group; a substituted or unsubstituted C2 to C30 alkynyl group; a substituted or unsubstituted C3 to C30 alicyclic organic group including a ring having double bond or triple bond in the ring; a substituted or unsubstituted C3 to C30 heterocycloalkyl group including a ring having a double bond or triple bond in the ring; a C3 to C30 alicyclic organic group substituted with a C2 to C30 alkenyl group or a C2 to C30 alkynyl group; and a C3 to C30 heterocycloalkyl group substituted with a C2 to C30 alkenyl group, or a C2 to C30 alkynyl group.

In the above Chemical Formula 2, X may be an alkenyl group, and may be a vinyl group or an allyl group, and a substituted or unsubstituted C3 to C30 alicyclic organic group including the ring having the double bond or triple bond in the ring as the X group may be a norbornene group, a maleimide group, a nadimide group, a tetrahydrophthalimide group, or a combination thereof.

In Chemical Formula 2, $L_2$ may be a substituted or unsubstituted pyrrolidine group, a substituted or unsubstituted tetrahydrofuran group, a substituted or unsubstituted pyridine group, a substituted or unsubstituted pyrimidine group, a substituted or unsubstituted piperidine group, a substituted or unsubstituted triazine group, or a substituted or unsubstituted isocyanurate group.

The second monomer of the above Chemical Formula 2 may include the compounds represented by the following Chemical Formulas 2-1 and 2-2.

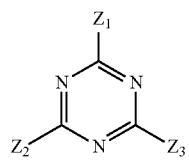

Chemical Formula 2-1

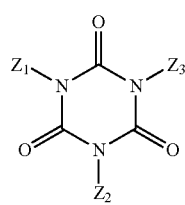

Chemical Formula 2-2

In Chemical Formulas 2-1 and 2-2, $Z_1$ to $Z_3$ are the same or different, and are *—$Y_2$—$X_n$ of the above Chemical Formula 2, wherein * represents the point of attachment to $L_2$.

More specific examples of the Chemical Formula 2 may include the compounds represented by the following Chemical Formulas 2-3 to 2-5.

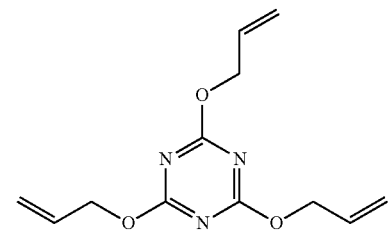

Chemical Formula 2-3

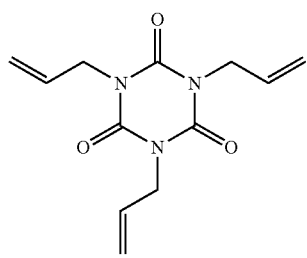

Chemical Formula 2-4

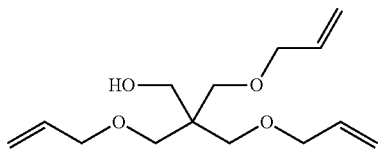

Chemical Formula 2-5

The polymer matrix has excellent compatibility with the semiconductor nanocrystal, and can suitably disperse the semiconductor nanocrystal. Also, because the polymer matrix can be cured in a shorted time at room temperature, high temperature process, which may deteriorate the stability of semiconductor nanocrystal, may be avoided. In addition, by providing a dense cross-linked to structure, extraneous factors such as oxygen or moisture may be blocked, so that the stability of the semiconductor nanocrystal is improved. Thereby, the luminous efficiency may be stably maintained for a long time.

The light conversion layer 130 may further include an inorganic oxide. The inorganic oxide may be silica, alumina, titania, zirconia, or a combination thereof. The inorganic oxide may be included in an amount of about 1 weight percent (wt %) to about 20 wt %, specifically about 2 wt % to about 15 wt %, based on the total weight of the light conversion layer 130.

The light conversion layer 130 may be provided in a form of a film in which the semiconductor nanocrystal is dispersed in the polymer matrix. The film may be fabricated in various thickness and shapes using a mold or by casting, for example.

The light conversion layer 130 may include the semiconductor nanocrystal in an amount of about 0.1 wt % to about 20 wt %, specifically about 0.2 wt % to about 15 wt %, and more specifically about 0.3 wt % to about 10 wt %, based on the total amount of light conversion layer 130. When the semiconductor nanocrystal and the polymer matrix are used within these ranges, the stability of the light conversion layer 130 may be improved.

The first monomer and the second monomer may be used so that the thiol group of the first monomer and the unsaturated carbon-carbon bond of the second monomer may be present at a mole ratio of about 0.5:1 to about 1:0.5, specifically about 0.75:1 to about 1:0.75, and more specifically about 1:0.9 to about 1:1.1. When the first monomer and the second monomer are used within these ranges, a polymer matrix having excellent mechanical strength and suitable physical properties, e.g. a suitable high density network may be provided.

The polymer matrix of the light conversion layer 130 may further include a polymerized product that is obtained by additionally polymerizing a third monomer having a thiol group located at the terminal end of the third monomer, a fourth monomer having an unsaturated carbon-carbon bond at a terminal end of the fourth monomer, or a combination thereof.

The third monomer may be a compound where, in Chemical Formula 1, m and k2 are each 1, and the fourth monomer may be a compound where, in Chemical Formula 2, n and k4 are each 1. In an embodiment, the third monomer is a compound of Chemical Formula 1 wherein m and k2 are each 1, and the fourth monomer is a compound of Chemical Formula 2 wherein n and k4 are each 1.

The semiconductor nanocrystal may further comprise a coating, the coating comprising a polymer having a carboxyl group or a salt thereof before being dispersed in the polymer matrix. The carboxyl group may be an acrylic acid group, a methacrylic acid group, or a salt thereof. The polymer having a carboxyl group or a salt thereof may be a poly(alkylene-co-acrylic acid), poly(alkylene-co-methacrylic acid), a salt thereof, or a combination thereof.

The polymer having a carboxyl group or a salt thereof may include a structural unit including a carboxyl group or a salt thereof in the polymer in an amount of about 1 mole percent (mol %) to about 100 mol %, specifically about 2 mol % to about 50 mol %, and more specifically about 4 mol % to about 20 mol %, based on a total moles of structural units of the polymer. When the structural unit including a carboxyl group or a salt thereof is included within the above range in the polymer, stability of the light conversion layer 130 may be improved.

The polymer having a carboxyl group or a salt thereof may have a melting point (Tm) of about 50° C. to about 300° C., specifically about 60° C. to about 200° C., and more specifically about 70° C. to about 200° C. When the polymer has a melting point within the above range, the semiconductor nanocrystal may be stably coated.

When the light emitted from the LED light source 110 is passed through the light conversion layer 130 including the semiconductor nanocrystal, blue light, green light, and red light are mixed to emit white light. By changing the compositions and sizes of semiconductor nanocrystals in the light conversion layer 130, the blue light, green light, and red light may be controlled to a desirable ratio, so as to provide white light which provides excellent color reproducibility and color purity. The white light may have color coordinates where Cx is about 0.24 to about 0.56 and Cy is about 0.24 to about 0.42 in a CIE 1931 chromaticity diagram.

For example, if the LED light source 110 is a blue LED light source, the light conversion layer 130 may include a green light emitting semiconductor nanocrystal and a red light emitting semiconductor nanocrystal in an optical density ratio of about 2:1 to 7:1, specifically about 2:1 to 6:1, wherein the optical density is determined using an absorbance of a first absorption maximum in a UV-Vis absorption spectrum. The peak wavelength of the blue LED light source may be in a range of about 430 nm to about 460 nm; the green light emitting semiconductor nanocrystal may have a peak wavelength ranging from about 520 nm to about 550 nm; and the red light emitting semiconductor nanocrystal may have a peak wavelength ranging from about 590 nm to about 640 nm.

In an embodiment, the light conversion layer 130 may include a plurality of layers. In an embodiment, the plurality of layers may be disposed so that the light emitting wavelength becomes longer in a direction towards the LED light source 110. For example, if the LED light source 110 is a blue LED light source, the light conversion layer 130 may include a red light conversion layer and a green light conversion layer that are sequentially stacked in a direction away from the LED light source 110.

Even though not shown in FIG. 1, on the light conversion layer 130, a film, e.g., a diffusion plate, a prism sheet, a microlens sheet, a brightness enhancement film (e.g., double brightness enhancement film ("DBEF")), or a combination thereof, may be further disposed. In addition, the light conversion layer 130 may be disposed between at least two films, e.g., a light guide panel, a diffusion plate, a prism sheet, a microlens sheet, a brightness enhancement film (e.g., double brightness enhancement film ("DBEF")), or a combination thereof.

Figure 2:
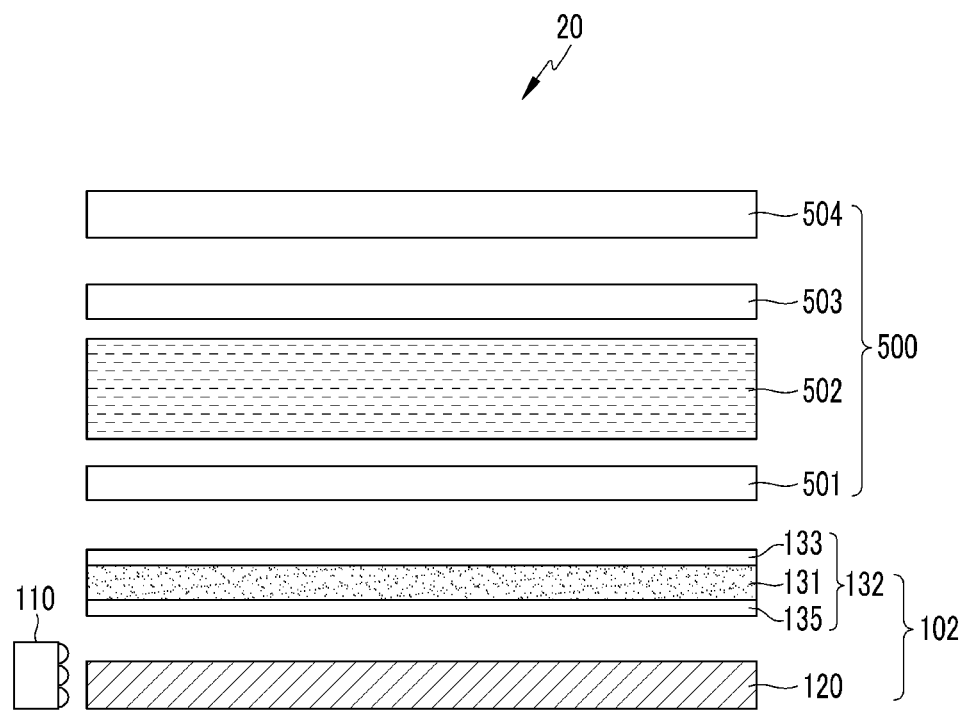
FIG. 2 is a schematic view of another embodiment of a liquid crystal display device.

FIG. 2 is a schematic view of a liquid crystal display device 20 including the backlight unit 102 according to another embodiment.

As shown in FIG. 2, a light conversion layer 132 may include a film 131 including the polymer matrix and the semiconductor nanocrystal, and at least one of a first polymer film 133 and a second polymer film 135 may be disposed on at least one surface of the film 131. The second polymer film 135 disposed under the film 131 may act as a barrier for preventing degradation of semiconductor nanocrystal due to the LED light source 110.

The first polymer film 133 and the second polymer film 135 may include a polyester, a cyclic olefin polymer ("COP"), a second polymer product produced by polymerization of the first monomer including at least two thiol (—SH) groups, each located at a terminal end of the first monomer, and the second monomer including at least two unsaturated carbon-carbon bonds at a terminal end of the second monomer, or a combination thereof. The polyester may include a polyethylene terephthalate, polybutylene terephthalate, polyethylene naphthalate, or the like, or a combination thereof. The cyclic olefin polymer may be a polymer produced by chain copolymerization of a cyclic monomer, such as a norbornene or a tetracyclododecene with a linear olefin monomer such as ethylene. In an embodiment, the polymerized product of the first monomer including at least two thiol (—SH) groups, each located at a terminal end of the first monomer, and the second monomer including at least two unsaturated carbon-carbon bonds at a terminal end of the second monomer, or a combination thereof may be the same as that described in the polymer matrix of the light conversion layer 130 of FIG. 1.

At least one of the first polymer film 133 and the second polymer film 135 may further include an inorganic oxide. The inorganic oxide may comprise silica, alumina, titania, zirconia, or a combination thereof. The inorganic oxide may act as a light diffusion material. The inorganic oxide may be disposed, e.g., coated on, the a surface of at least one of the first polymer film 133 and the second polymer film 135, and a thickness thereof may be about 10 nm to about 100 nm.

The inorganic oxide of the first polymer film 133 may be included in an amount of about 1 wt % to about 20 wt %, specifically about 2 wt % to about 15 wt %, based on the total weight of the first polymer film 133. The inorganic oxide of the second polymer film 135 may be included in an amount of about 1 wt % to about 20 wt %, specifically about 2 wt % to about 15 wt %, based on the total weight of the second polymer film 135. In addition, when included within the range, the polymer film is easily fabricated, water vapor permeability may be decreased, and the role of the diffusion film may be sufficiently performed, so as to substitute for a diffusion film.

The first polymer film 133 may have concavo-convex pattern having a predetermined size on the surface opposite, e.g., not contacting, the film 131 including a polymer matrix and semiconductor nanocrystal. The second polymer film 135 may also have concavo-convex pattern having a predetermined size on the surface opposite, e.g., not contacting, the film 131 including a polymer matrix and semiconductor nanocrystal. The first polymer film 133 and the second polymer film 135, with the concavo-convex pattern thereon, may suitably diffuse light emitted from the LED light source 110. Accordingly, the liquid crystal display device may omit a diffusion plate or a prism sheet from the light guide panel 120. However, according to another embodiment, the diffusion plate or a prism sheet may be disposed on the light guide panel 120.

Even though not shown in FIG. 2, a film, e.g., a diffusion plate, a prism sheet, a microlens sheet, and a brightness enhancement film (e.g., double brightness enhancement film ("DBEF")), or a combination thereof, may be further disposed on the light conversion layer 132. In addition, the light conversion layer 132 may be disposed between at least two films, e.g., a light guide panel, a diffusion plate, a prism sheet, a microlens sheet, a brightness enhancement film (e.g., double brightness enhancement film ("DBEF")), or a combination thereof.

The light conversion layer 132 may have oxygen transmission rate of about 0.01 $cm^3/m^2 \cdot day \cdot atm$ to about 10 $cm^3/m^2 \cdot day \cdot atm$ and water vapor transmission rate of about 0.001 $g/m^2 \cdot day$ to about 10 $g/m^2 \cdot day$. When having the oxygen permeation and the moisture permeation within the range, the semiconductor nanocrystal may be stably protected against the ambient conditions.

Figure 3:
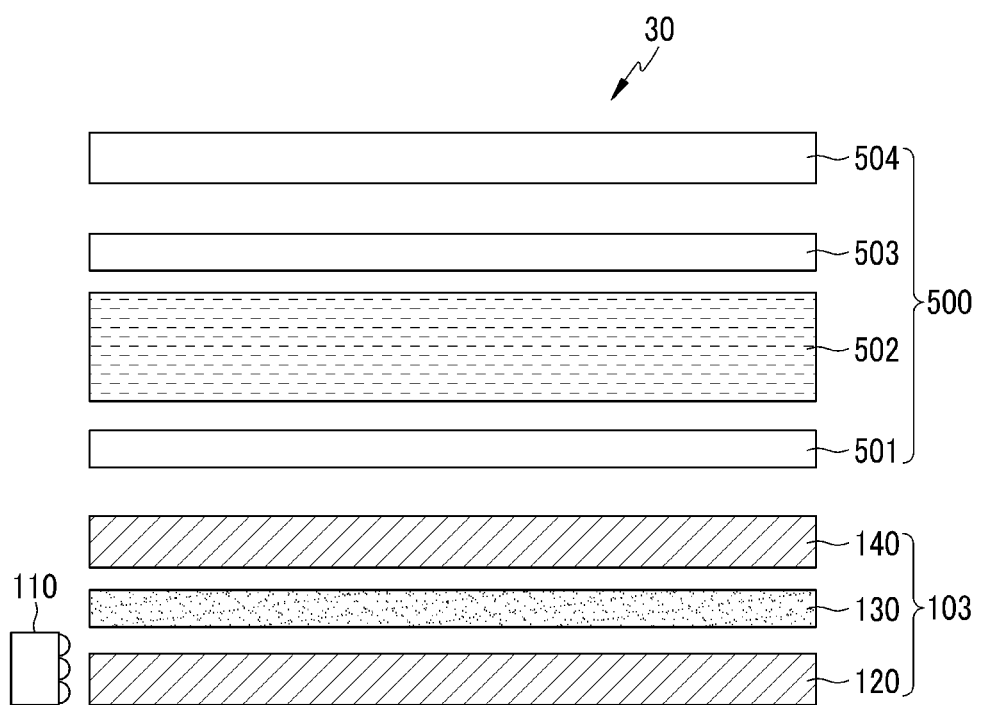
FIG. 3 is a schematic view of another embodiment of a liquid crystal display device.

FIG. 3 is a schematic view of a liquid crystal display device 30 including a backlight unit 103 comprising a diffusion plate 140 between the light conversion layer 130 and the first polarizer 501 of the liquid crystal panel 500 in the liquid crystal display device 10 shown in FIG. 1. The diffusion plate 140 diffuses and emits white light provided from the light conversion layer 130. Accordingly, the uniformity of white light transmitted through the diffusion plate 140 may be improved. In an embodiment, the light conversion layer 130 may be spaced apart from the diffusion plate 140 as shown in FIG. 3. In another embodiment, the light conversion layer 130 may be disposed to contact the diffusion plate 140.

Even though not shown in FIG. 3, a film, e.g., a prism sheet, a microlens sheet, and a brightness enhancement film (e.g., double brightness enhancement film ("DBEF")), or a combination thereof, may be further disposed on the diffusion plate 140. In addition, the light conversion layer 130 may be disposed between at least two films, e.g., a diffusion plate, a prism sheet, a microlens sheet, a brightness enhancement film (e.g., double brightness enhancement film (DBEF")), or a combination thereof.

Figure 4:
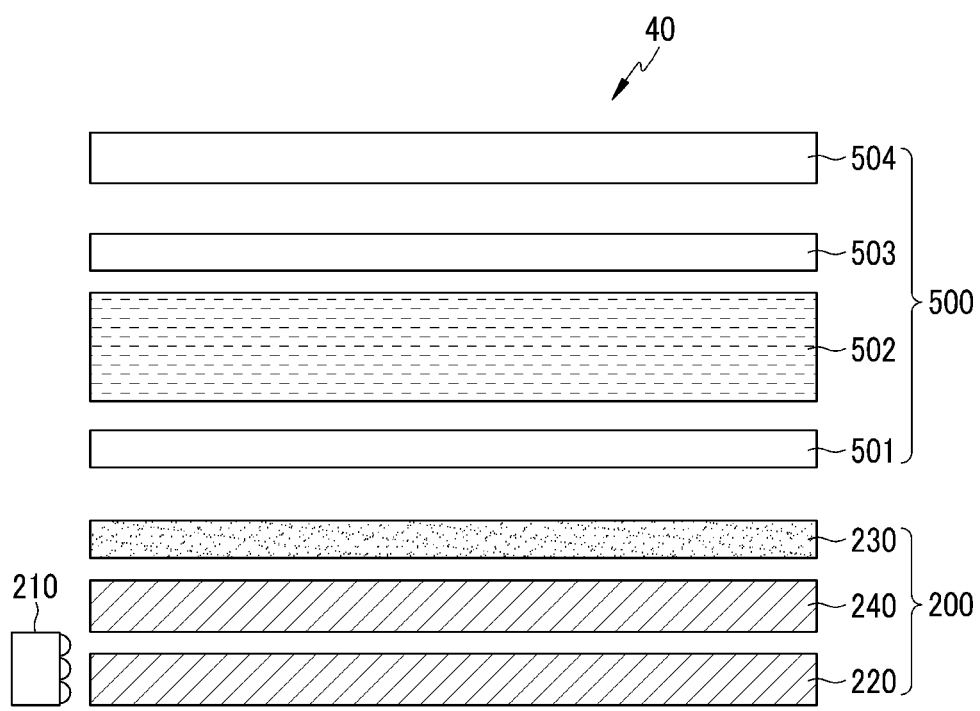
FIG. 4 is a schematic view of another embodiment of a liquid crystal display device.

FIG. 4 is a schematic view of a liquid crystal display device 40 including a backlight unit according to another embodiment. The backlight unit 200 shown in FIG. 4 includes an LED light source 210, a light guide panel 220, a diffusion plate 240, and a light conversion layer 230.

The LED light source 210 includes a plurality of LED chips emitting light having a predetermined wavelength. The LED light source 210 may be an LED light source emitting blue light or an LED light source emitting ultraviolet ("UV") light.

The light guide panel 220 guides the light emitted from the LED light source 210 into the light conversion layer 230. A reflector (not shown) may be further disposed on the lower surface of the light guide panel 220.

The uniformity of light emitted from the LED light source 210 is improved while passing through the diffusion plate 240 and the light guide panel 220.

The light conversion layer 230 may be disposed so as to keep a predetermined distance from the LED light source 210, and is effective to convert the light emitted from the LED light source 210 into white light and emit it toward the liquid crystal panel 500.

The light conversion layer 230 includes a semiconductor nanocrystal and a polymer matrix to provide excellent color reproducibility and color purity. The semiconductor nanocrystal and the polymer matrix may be the same as described in the light conversion layer 130 of FIG. 1.

The light conversion layer 230 may be disposed in contact with or apart from the diffusion plate 240.

On at least one surface of the light conversion layer 230, the first polymer film 133, and the second polymer film 135 may be disposed as shown in FIG. 2.

In another embodiment, the light conversion layer 230 may include a plurality of layers. In this case, the plurality of layers may be disposed so that the light emitting wavelength becomes longer in a direction towards the LED light source 210. For example, when the LED light source 210 is a blue LED light source, the light conversion layer 230 may include a red light conversion layer and a green light conversion layer that are sequentially stacked in a direction away from the LED light source 210.

The white light emitted from the backlight unit, e.g., backlight units 100, 102, 103, and 200, is incident toward the liquid crystal panel 500. The liquid crystal panel 500 provides a predetermined color image using the white light incident from the backlight units. The liquid crystal panel 500 may have a structure in which a first polarizer 501, a liquid crystal layer 502, a second polarizer 503, and a color filter 504 are sequentially disposed. The white light emitted from the backlight unit, e.g., backlight units 100, 102, 103, and 200, is transmitted through the first polarizer 501, the liquid crystal layer 502, and the second polarizer 503 and then into the color filter 504 to express a predetermined color image.

Figure 5:
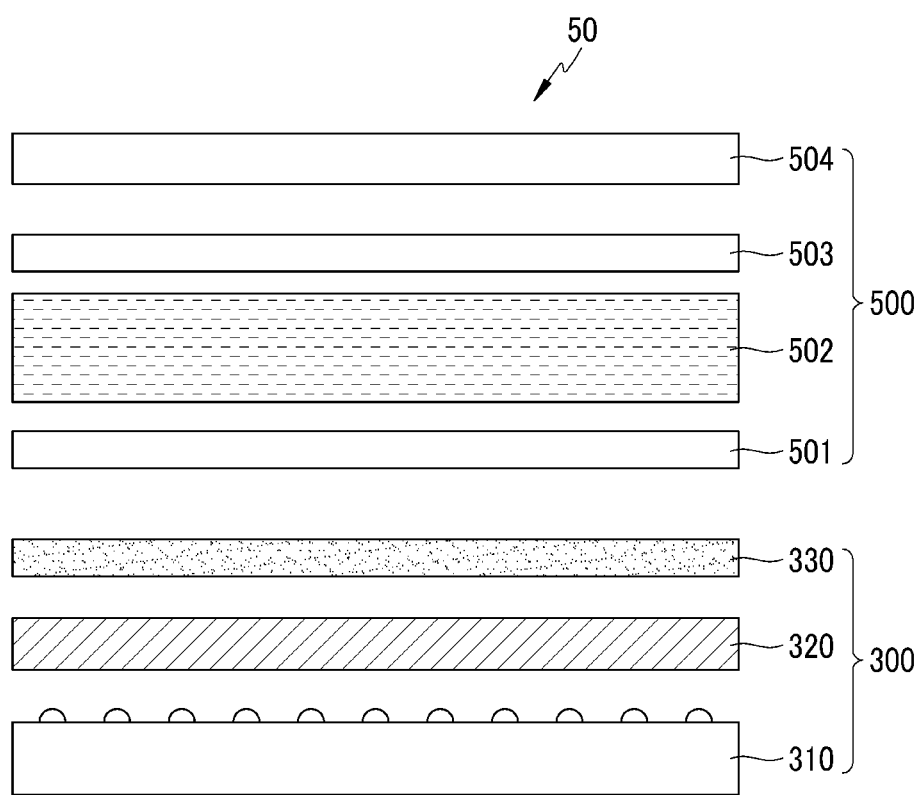
FIG. 5 is a schematic view of another embodiment of a liquid crystal display device.

FIG. 5 is a schematic view of a liquid crystal display device 50 including the backlight unit according to another embodiment. Hereinafter, it is described with regard to different aspects from those described in the above embodiments.

Referring to FIG. 5, a backlight unit 300 according to another embedment includes an LED light source 310 and a light conversion layer 330 apart from the LED light source 310. According to an embodiment, the LED light source 310 may be disposed under a surface of the light conversion layer 330. The LED light source 310 may be an LED light source emitting blue light or an LED light source emitting ultraviolet ("UV") light.

A light passage may be disposed between the LED light source 310 and the light conversion layer 330, and for example, a light guide panel 320 may be disposed under the light conversion layer 330. The light guide panel 320 is used to guide light emitted from the LED light source 310 thereof towards the light conversion layer 330. A reflector (not shown) may be further disposed on the lower surface of the light guide panel 320.

Thereby, the light emitted from the LED light source 310 is provided into the light conversion layer 330 through the light guide panel 320, and the incident light is transmitted into the light conversion layer 330 to be converted into white light.

The light conversion layer 230 includes a polymer matrix and a semiconductor nanocrystal to accomplish excellent color reproducibility and color purity. The semiconductor nanocrystal and the polymer matrix are the same as described in the light conversion layer 130 of FIG. 1.

The first polymer film 133 and the second polymer film 135 shown in FIG. 2 may be disposed on at least one surface of the light conversion layer 330.

In another embodiment, the light conversion layer 330 may include a plurality of layers. In this case, the plurality of layers may be disposed so that a light emitting wavelength of becomes longer in a direction towards the LED light source 310. For example, when the LED light source 310 is a blue LED light source, the light conversion layer 330 may include a red light conversion layer and a green light conversion layer that are sequentially stacked in a direction away from the LED light source 310.

A diffusion plate may be further disposed between the light conversion layer 330 and the liquid crystal panel 500. The diffusion plate may be disposed on at least one of the upper surface and the lower surface of the light conversion layer 330 as shown in FIG. 3 and FIG. 4.

In addition, the light conversion layer 330 and the diffusion plate may contact each other or may be disposed apart from each other.

As described above, the light conversion layers 130, 132, 230, and 330 may each independently include the semiconductor nanocrystal to improve the color reproducibility and the color purity, and may each independently include a polymer matrix having a dense polymer network to prevent degradation of the semiconductor nanocrystal. Since the light conversion layers 130, 132, 230, and 330 are disposed apart from the LED light sources 110, 210, and 310 and are disposed in a form of a sheet, the light conversion layers 130, 132, 230, and 330 may not be degraded by heat generated from the LED light sources 110, 210, and 310.

In addition, since the light conversion layers 130, 132, 230, and 330 including a matrix resin and the semiconductor nanocrystal may be fabricated as a separate film, the manufacturing process of the backlight unit may be simplified.

Hereinafter, the embodiments are illustrated in more detail with reference to examples. However, they are exemplary embodiments of this disclosure and are not limiting.

Example 1: Fabrication of Light Conversion Layer

Green semiconductor nanocrystal (CdSe/ZnS/CdZnS) with a light emitting wavelength of 536 nanometers (nm) is dispersed into 119 microliters (4) of toluene to have an optical density ("OD") of 0.10, wherein the optical density is determined using the absorbance of the first absorption maximum wavelength in a UV-Vis absorption spectrum of a 100 times-diluted solution, to provide a green semiconductor nanocrystal dispersion solution.

Red semiconductor nanocrystal (CdSe/CdSZnS) having a light emitting wavelength of 624 nm is dispersed into 36 μL of toluene to have an optical density ("OD") of 0.10, to provide a red semiconductor nanocrystal dispersion solution.

The green semiconductor nanocrystal dispersion and red semiconductor nanocrystal dispersion are mixed, ethanol is added thereto, and then the mixture is centrifuged.

The supernatant of the solution excluding the centrifuged precipitant is discarded, and the precipitant is dispersed in 1.2 grams (g) of pentaerythritol tetrakis(3-mercaptopropionate) as a first monomer.

0.8 g of 1,3,5-triallyl-1,3,5-triazin-2,4,6-trione as a second monomer and 0.04 g of oxy-phenyl-acetic acid 2-[2-oxo-2-phenyl-acetoxy-ethoxy]-ethyl ester as a photoinitiator are added to the resulting mixture to prepare a mixture.

The mixture is coated on a polyethylene terephthalate ("PET") substrate and UV irradiated to fabricate a film for a light conversion layer.

Comparative Example 1: Fabrication of Light Conversion Layer

Green semiconductor nanocrystal (CdSe/ZnS/CdZnS) with a light emitting wavelength of 538 nm is dispersed into 154 μL of toluene to have an optical density ("OD") of 0.10 (wherein the OD is determined using the absorbance of the first absorption maximum wavelength in UV-Vis absorption spectrum of a 100 times-diluted solution), to provide a green semiconductor nanocrystal dispersion solution.

Red semiconductor nanocrystal (CdSe/CdSZnS) having a light emitting wavelength of 623 nm is dispersed into 51 μL of toluene to have an optical density ("OD") of 0.10, to provide a red semiconductor nanocrystal dispersion solution.

The green semiconductor nanocrystal dispersion and red semiconductor nanocrystal dispersion are mixed, ethanol is added thereto, and the mixture centrifuged. The supernatant of the solution excluding the centrifuged precipitant is discarded, and the precipitant is dispersed in 4 g of isobornyl acrylate. 3.2 g of trimcyclodecane dimethanol diacrylate and 0.8 g of trimethylol propane triacrylate, and 0.2 g of 1-hydroxy-cyclohexyl-phenyl-ketone and 0.1 g of diphenyl (2,4,6-trimethylbenzoyl)-phosphine oxide) as a photoinitiator are dissolved, and 2 g of an urethane acrylate oligomer (EB270, Deicel) are mixed followed by agitating. The isobornyl acrylate solution in which green semiconductor nanocrystal and red semiconductor nanocrystal is dispersed is mixed therewith to prepare a photocurable composition.

The photocurable composition is coated on a PET substrate and UV irradiated to fabricate a film for a light conversion layer.

Figure 6:
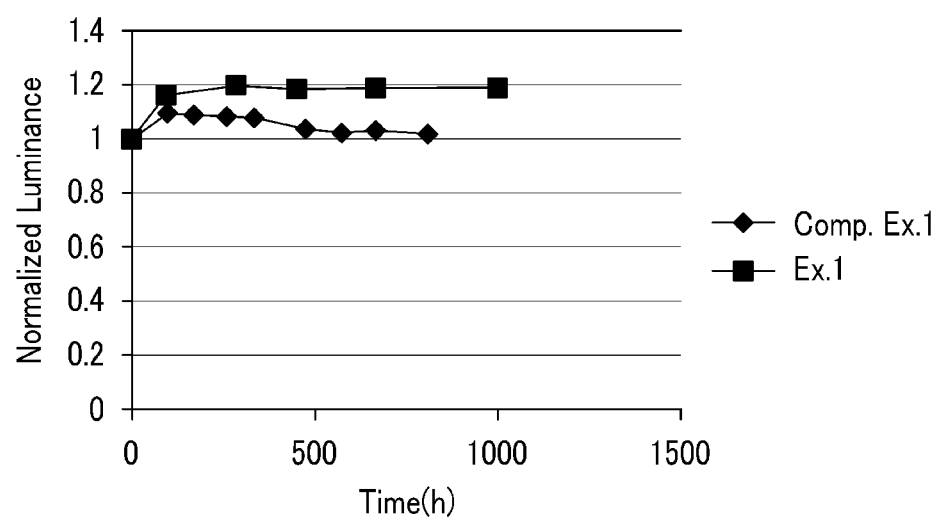
FIG. 6 is a graph of normalized luminance versus time (hours, h) showing luminance of liquid crystal display according to Example 1 and Comparative Example 1.

A liquid crystal display device having a backlight unit (BLU) fabricated by inserting each light conversion layer according to Example 1 and Comparative Example 1 is operated in 50° C. chamber and luminance is measured. The results are shown in FIG. 6. As shown in FIG. 6, the liquid crystal display device having a light conversion layer according to Example 1 including a polymerized product of a first monomer including at least two thiol (—SH) groups, each located at a terminal end of the first monomer, and a second monomer including at least two unsaturated carbon-carbon bonds, each located at a terminal end of the second monomer, shows improved luminance after about 1000 hours compared with that of Comparative Example 1.

Example 2: Fabrication of Light Conversion Layer

Synthesis of Green Semiconductor Nanocrystal (InZnP/ZnSeS/ZnS) Coated with Polymer 4 g of a polyethylene-co-polyacrylic acid copolymer (15 wt % of polyacrylic acid) is put into a flask and 38 mL of toluene is added under a nitrogen atmosphere to prepare a polymer solution. The polymer solution is heated at 120° C. to dissolve the copolymer completely.

Green semiconductor nanocrystal with a light emitting wavelength of 542 nm is dispersed into 40 mL of toluene to have an optical density ("OD") of 0.015 (determined using the absorbance of the first absorption maximum wavelength in UV-Vis absorption spectrum of a 100 times-diluted solution), to provide a green semiconductor nanocrystal dispersion solution.

The green semiconductor nanocrystal dispersion solution is mixed with the polymer solution and stirred at 120° C. for 30 minutes. 10 mL of a solution including diethyl zinc (Zn(Et)$_2$) dissolved in toluene at a concentration of 0.2 molar (M) is added in a dropwise fashion and reacted for 30 minutes. After the reaction, the resultant is cooled to 50° C. and then filtered followed by rinsing with hexane and vacuum drying to obtain green semiconductor nanocrystals coated with polyethylene-co-polyacrylic acid copolymer that is coordinated with zinc ion. The polyethylene-co-polyacrylic acid copolymer is coated in an amount of about 650 parts by weight, based on 100 parts by weight of the green semiconductor nanocrystal.

Synthesis of Red Semiconductor Nanocrystal (InP/ZnSeS/ZnS) Coated with Polymer 1.41 g of a polyethylene-co-polyacrylic acid copolymer (15 wt % of polyacrylic acid) is put into a flask and 15 mL of toluene is added under a nitrogen atmosphere to prepare a polymer solution. The polymer solution is heated at 120° C. to dissolve the copolymer completely.

Red semiconductor nanocrystals with a light emitting wavelength of 620 nm is dispersed into 15 mL of toluene to have an optical density ("OD") of 0.014, to provide a red semiconductor nanocrystal dispersion solution.

The red semiconductor nanocrystal dispersion solution is mixed with the polymer solution and stirred at 120° C. for 30 minutes. 3.5 mL of solution including diethyl zinc (Zn(Et)$_2$) dissolved in toluene at a concentration of 0.2 M is added in a dropwise fashion and reacted for 30 minutes. After the reaction, the resultant is cooled to 50° C. and then filtered followed by rinsing with hexane and vacuum drying to obtain red semiconductor nanocrystals coated with polyethylene-co-polyacrylic acid copolymer that is coordinated with zinc ion. The polyethylene-co-polyacrylic acid copolymer is coated in an amount of about 660 parts by weight, based on 100 parts by weight of the red semiconductor nanocrystal.

0.45 g of the green semiconductor nanocrystal coated with the copolymer, 0.13 g of the red semiconductor nanocrystal coated with the copolymer, 2.4 g of pentaerythritol tetrakis(3-mercaptopropionate) as a first monomer, 1.6 g of 1,3,5-triallyl-1,3,5-triazin-2,4,6-trione as a second monomer, and 0.08 g of oxy-phenyl-acetic acid 2-[2-oxo-2-phenyl-acetoxy-ethoxy]-ethyl ester as a photoinitiator are mixed to prepare a mixture.

The mixture is coated on a polyethylene terephthalate ("PET") substrate and UV irradiated to fabricate a film for a light conversion layer.

Comparative Example 2: Fabrication of Light Conversion Layer 0.34 g of the green semiconductor nanocrystal coated with the copolymer and 0.10 g of the red semiconductor nanocrystal coated with the copolymer synthesized in Example 2 are mixed with 1.2 g of isobornyl acrylate.

0.96 g of trimcyclodecane dim ethanol diacrylate and 0.24 g of trimethylol propane triacrylate, and 0.06 g of 1-hydroxy-cyclohexyl-phenyl-ketone and 0.03 g of diphenyl (2,4,6-trimethylbenzoyl)-phosphine oxide) as a photoinitiator are dissolved, and 0.6 g of an urethane acrylate oligomer (EB270, Deicel) are mixed followed by agitating.

The isobornyl acrylate solution having mixture of the polymer coated green semiconductor nanocrystal and the polymer coated red semiconductor nanocrystal is mixed therewith to prepare a photocurable composition.

The photocurable composition is coated on a PET substrate and UV irradiated to fabricate a film for a light conversion layer.

Figure 7:
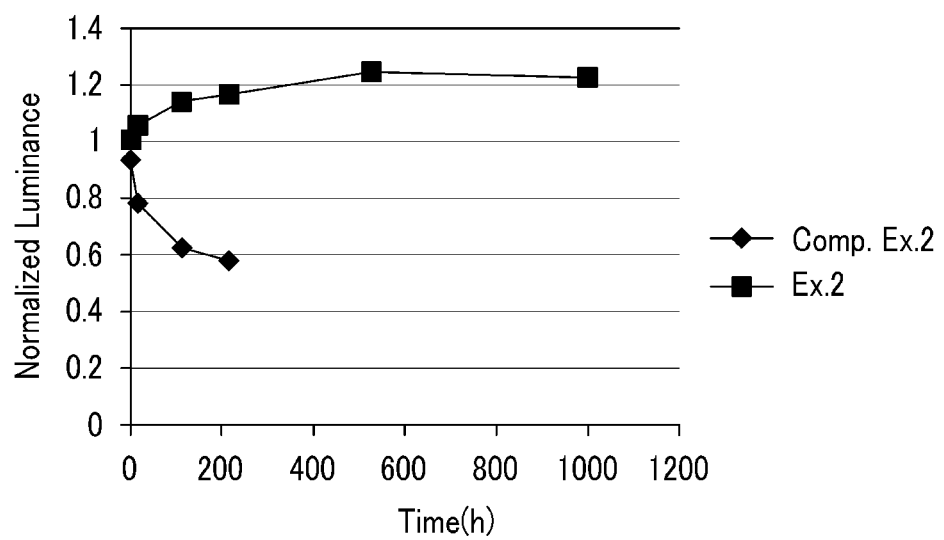
FIG. 7 is a graph of normalized luminance versus time (hours, h) showing luminance of liquid crystal display according to Example 2 and Comparative Example 2.

A liquid crystal display device having a backlight unit (BLU) fabricated by inserting each light conversion layer according to Example 2 and Comparative Example 2 is operated at room temperature and luminance is measured. The results are shown in FIG. 7. As shown in FIG. 7, the liquid crystal display according to Example 2 including a polymerized product of a first monomer including at least two thiol (—SH) groups, each located at a terminal end of the first monomer, and a second monomer including at least two unsaturated carbon-carbon bonds, each located at a terminal end of the second monomer, shows improved luminance after about 1000 hours compared with that of Comparative Example 2.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments shall be understood to be exemplary and not limiting the present invention in any way.

What is claimed is:

1. A display device comprising:
a light source; and
a light conversion layer disposed over the light source to convert light from the light source,
wherein the light conversion layer comprises a polymer matrix and semiconductor nanocrystals dispersed in the polymer matrix,
wherein the light conversion layer comprises a plurality of layers comprising a red light conversion layer and a green light conversion layer,
wherein the semiconductor nanocrystals in the red light conversion layer comprises a red light emitting semiconductor nanocrystal, and the semiconductor nanocrystals in the green light conversion layer comprises a green light emitting semiconductor nanocrystal,
wherein the polymer matrix comprises a first polymerized product of monomers selected from the group consisting of
at least one first monomer including at least two thiol (—SH) groups, each located at a terminal end of the at least one first monomer, and
at least one second monomer including at least two unsaturated carbon-carbon bonds, each located at a terminal end of the at least one second monomer,
wherein the at least one second monomer of the polymer matrix is represented by the following Chemical Formula 2:

Chemical Formula 2

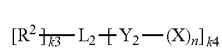

wherein, in Chemical Formula 2,
X is a C2 to C30 aliphatic hydrocarbon group including a carbon-carbon double bond or a carbon-carbon triple bond, a C6 to C30 aromatic hydrocarbon group including a carbon-carbon double bond or a carbon-carbon triple bond, or a C3 to C30 alicyclic hydrocarbon group including a carbon-carbon double bond or a carbon-carbon triple bond,
R$^2$ is hydrogen; a substituted or unsubstituted C1 to C30 alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a substituted or unsubstituted C2 to C30 alkenyl group; a substituted or unsubstituted C2 to C30 alkynyl group; a substituted or unsubstituted C3 to C30 alicyclic hydrocarbon group including a ring having double bond or triple bond in the ring; a substituted or unsubstituted C3 to C30 heterocycloalkyl group including a ring having a double bond or triple bond in the ring; a C3 to C30 alicyclic hydrocarbon group substituted with a C2 to C30 alkenyl group or a C2 to C30 alkynyl group; a C3 to C30 heterocycloalkyl group substituted with a C2 to C30 alkenyl group or a C2 to C30 alkynyl group; a hydroxy group; —NH$_2$; a substituted or unsubstituted C1 to C30 amine group of the formula —NRR' wherein R and R' are independently hydrogen or a C1 to C20 alkyl group; an isocyanate group; an isocyanurate group; a (meth)acrylate group; a halogen; —ROR' wherein R is a substituted or unsubstituted C1 to C20 alkylene group and R' is hydrogen or a C1 to C20 alkyl group; an acyl halide group of the formula —RC(=O)X, wherein R is a substituted or unsubstituted alkylene group, and X is a halogen; —C(=O)OR', wherein R' is hydrogen or a C1 to C20 alkyl group; —CN; or —C(=O)ONRR', wherein R and R' are each independently hydrogen or a C1 to C20 alkyl group, L$_2$ is a single bond, a substituted or unsubstituted C1 to C30 alkylene group, a substituted or unsubstituted C6 to C30 arylene group, or a substituted or unsubstituted C3 to C30 heteroarylene group, Y$_2$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene group (—CH$_2$—) is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group of the formula —C(=O)NR— wherein R is hydrogen or a C1 to C10 alkyl group, —NR— (wherein R is hydrogen or a C1 to C10 alkyl group), or a combination thereof, n is an integer of 1 or more,
k3 is an integer of 0 or 1 or more,
k4 is an integer of 1 or more,
the sum of n and k4 is an integer of 3 or more,
n does not exceed the valance of Y$_2$, and
the sum of k3 and k4 does not exceed the valence of the L$_2$.

2. The display device of claim 1, wherein the at least one second monomer does not include silane or siloxane, and
wherein neither the at least one first monomer nor the at least one second monomer is substituted with an acid group.

3. The display device of claim 1, wherein the semiconductor nanocrystal particles do not comprise CdSe, CdSeS, CdZnSe, CdZnS, CdSZnS, CdTe, or a combination thereof.

4. The display device of claim 1, wherein the green light emitting semiconductor nanocrystal and the red light emitting semiconductor nanocrystal have a core-shell structure, and in the core-shell structure, a core comprising a first semiconductor nanocrystal is at least partially surrounded by a shell comprising a second semiconductor nanocrystal.

5. The display device of claim 4, wherein the first semiconductor nanocrystal and the second semiconductor nanocrystal comprise a Group II-VI compound, a Group III-V compound, a Group IV-VI compound, a Group IV element, a Group IV compound, or a combination thereof.

6. The display device of claim 1, wherein the green light emitting semiconductor nanocrystal emits light having a peak wavelength of from about 520 nm to about 550 nm, and the red light emitting semiconductor nanocrystal emits light having a peak wavelength of from about 590 nm to about 640 nm.

7. The display device of claim 1, wherein the red light emitting semiconductor nanocrystal and the green light emitting semiconductor nanocrystal have a full width at half maximum of less than or equal to about 45 nanometers in a light emitting wavelength spectrum.

8. The display device of claim 1, wherein the at least one first monomer of the polymer matrix is represented by Chemical Formula 1:

Chemical Formula 1

wherein, in Chemical Formula 1,
R$^1$ is hydrogen; a substituted or unsubstituted C1 to C30 alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a substituted or unsubstituted C2 to C30 alkenyl group; a substituted or unsubstituted C2 to C30 alkynyl group; a substituted or unsubstituted C3 to C30 alicyclic organic group including a ring having a double bond or triple bond in the ring; a substituted or unsubstituted C3 to C30 heterocycloalkyl group including a ring having a double bond or triple bond in the ring; a C3 to C30 alicyclic organic group substituted with a C2 to C30 alkenyl group or a C2 to C30 alkynyl group; a C3 to C30 heterocycloalkyl group substituted with a C2 to C30 alkenyl group or a C2 to C30 alkynyl group; a hydroxy group; —NH$_2$; a substituted or unsubstituted C1 to C30 amine group of the formula —NRR', wherein R and R' are independently hydrogen or a C1 to C30 alkyl group; an isocyanurate group; a (meth)acrylate group; a halogen; —ROR' wherein R is a substituted or unsubstituted C1 to C20 alkylene group and R' is hydrogen or a C1 to C20 alkyl group; —C(=O)OR' wherein R' is hydrogen or a C1 to C20 alkyl group; —CN; or —C(=O)ONRR' wherein R and R' are each independently hydrogen or a C1 to C20 alkyl group, L$_1$ is a single bond; a substituted or unsubstituted C1 to C30 alkylene group; a substituted or unsubstituted C6 to C30 arylene group; a substituted or unsubstituted C3 to C30 heteroarylene group; a substituted or unsubstituted C3 to C30 cycloalkylene group; or a substituted or unsubstituted C3 to C30 heterocycloalkylene group, Y$_1$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene group (—CH$_2$—) is replaced by a sulfonyl group (—S(=O)$_2$—), a carbonyl group (—C(=O)—), an ether group (—O—), a sulfide group (—S—), a sulfoxide group (—S(=O)—), an ester group (—C(=O)O—), an amide group of the formula —C(=O)NR— wherein R is hydrogen or a C1 to C10 alkyl group, —NR— wherein R is hydrogen or a C1 to C10 alkyl group, or a combination thereof, m is an integer of 1 or more,
k1 is an integer of 0 or 1 or more,
k2 is an integer of 1 or more,
the sum of m and k2 is an integer of 3 or more,
m does not exceed the valance of Y$_1$, and
the sum of k1 and k2 does not exceed the valence of the L$_1$.

9. The display device of claim 1, wherein the first monomer comprises a compound represented by Chemical Formula 1-1:

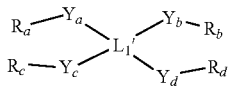

Chemical Formula 1-1

In Chemical Formula 1-1, $L_1'$ is carbon, a substituted or unsubstituted C6 to C30 arylene group, for example a substituted or unsubstituted phenylene group; a substituted or unsubstituted C3 to C30 heteroarylene group; a substituted or unsubstituted C3 to C30 cycloalkylene group; or a substituted or unsubstituted C3 to C30 heterocycloalkylene group, $Y_a$ to $Y_d$ are each independently a substituted or unsubstituted C1 to C30 alkylene group; a substituted or unsubstituted C2 to C30 alkenylene group; or a C1 to C30 alkylene group or a C2 to C30 alkenylene group wherein at least one methylene group (—$CH_2$—) is replaced by a sulfonyl group (—$S(=O)_2$—), a carbonyl group (—C(=O)—), an ether group (—O—), a sulfide group (—S—), a sulfoxide group (—S(=O)—), an ester group (—C(=O)O—), an amide group of the formula —C(=O)NR— wherein R is hydrogen or a C1 to C10 alkyl group, —NR— wherein R is hydrogen or a C1 to C10 alkyl group, or a combination thereof, $R_a$ to $R_d$ are each independently a thiol group (—SH), or one or more of the groups $R_a$—$Y_a$—, $R_b$—$Y_b$—, $R_c$—$Y_c$—, and $R_d$—$Y_d$— are $R_1$ of Chemical Formula 1, provided that at least two of $Y_a$ to $Y_d$ are as defined above and two of $R_a$ to $R_d$ are thiol groups (—SH).

10. The display device of claim 1, wherein the light conversion layer further comprises an inorganic oxide in an amount of about 2 wt % to about 20 wt % based on a total weight of the light conversion layer.

11. The display device of claim 9, wherein the inorganic oxide comprises silica, alumina, titania, zirconia, or a combination thereof.

12. The display device of claim 1, wherein the light source emits blue light.

13. The display device of claim 1, wherein the red light conversion layer further comprises at least one of a first polymer film or a second polymer film disposed on at least one surface of the red light conversion layer.

14. The display device of claim 13, wherein at least one of the first polymer film or the second polymer film further comprises an inorganic oxide.

15. The display device of claim 13, wherein at least one of the first polymer film or the second polymer film has a cavo-convex pattern on a surface opposite the red light conversion layer.

16. The display device of claim 1, wherein the green light conversion layer further comprises at least one of a first polymer film or a second polymer film disposed on at least one surface of the green light conversion layer.

17. The display device of claim 16, wherein at least one of the first polymer film or the second polymer film further comprises an inorganic oxide.

18. The display device of claim 16, wherein at least one of the first polymer film or the second polymer film has a cavo-convex pattern on a surface opposite the green light conversion layer.

19. The display device of claim 1, wherein the semiconductor nanocrystals further comprise a coating, the coating comprising a polymer having a carboxyl group, or a salt thereof.

* * * * *